United States Patent
Lee

(10) Patent No.: US 7,107,074 B2
(45) Date of Patent: Sep. 12, 2006

(54) COMPUTER SYSTEM WITH WIRELESS AUDIO SIGNAL TRANSMITTER MODULE

(75) Inventor: Rong-Jung Lee, Tainan (TW)

(73) Assignee: Mitac Technology Corp., Hsin-Chu Hsien (TW)

( * ) Notice: Subject to any disclaimer, the term of this patent is extended or adjusted under 35 U.S.C. 154(b) by 474 days.

(21) Appl. No.: 10/458,669

(22) Filed: Jun. 11, 2003

(65) Prior Publication Data

US 2004/0147224 A1 Jul. 29, 2004

(30) Foreign Application Priority Data

Jan. 29, 2003 (CN) ................. 92 2 01716

(51) Int. Cl.
*H04B 1/38* (2006.01)
*H04M 1/00* (2006.01)

(52) U.S. Cl. ............ 455/557; 455/556.1; 455/11.1; 455/70; 455/221; 455/253.2; 379/38; 379/102.03; 381/70; 381/14; 725/81

(58) Field of Classification Search ........ 455/557, 455/556.1, 70, 221, 253.2; 381/70, 14; 725/81; 379/38, 102.03
See application file for complete search history.

(56) References Cited

U.S. PATENT DOCUMENTS 5,577,266 A * 11/1996 Takahisa et al. ........... 455/3.06
5,818,328 A * 10/1998 Anderson et al. ......... 340/384.72
6,653,937 B1 * 11/2003 Nelson et al. ........... 340/539.1
6,799,056 B1 * 9/2004 Curley et al. ........... 455/556.1
6,965,769 B1 * 11/2005 Bims et al. ............... 455/423

FOREIGN PATENT DOCUMENTS

| JP | 09-021279 | 1/1997 |
|---|---|---|
| JP | 09212179 | 8/1997 |
| TW | 406908 | 9/2000 |
| TW | 433501 | 5/2001 |

* cited by examiner

*Primary Examiner*—Marceau Milord
(74) *Attorney, Agent, or Firm*—Rosenberg, Klein & Lee

(57) ABSTRACT

A computer system provides a wireless audio signal transmitter module which is capable of transmitting audio signal wirelessly from a host computer to at least one remote wireless signal receiver. The wireless audio signal transmitter module is connected to a sound effect interface for receiving audio signal from the computer. The audio signal is processed, modulated, and then transmitted out by an antenna. The wireless signal is received and processed by the audio signal receiver located within an effective transmission distance. The signal is then transmitted to a user via a microphone.

10 Claims, 4 Drawing Sheets

COMPUTER SYSTEM WITH WIRELESS AUDIO SIGNAL TRANSMITTER MODULE

BACKGROUND OF THE INVENTION

1. Field of the Invention

The present invention relates generally to audio signal receiving and transmission of a computer system, and in particular to a computer system with a wireless audio signal transmitter module capable of transmitting audio signals between a host computer and at least one wireless signal receiver in a wireless manner.

2. Description of the Prior Art

Computers are widely used in a variety of applications, such as industry, business, office, education and household applications. A multi-media computer system comprises a host computer to which audio/video processing means is coupled for handling audio and video signals. The audio and video signals processed in the host computer are broadcast and displayed by means of speakers and image displays.

Conventionally, a speaker is connected by a cable plugged to the host computer. Generally, a speaker broadcasts music openly. In other words, the sound or music from a speaker is transmitted and spread out to every corner. It is understandable that broadcasting is not appropriate or allowed in some environment for example in an Office. Also, in some situation, the user has to turn the volume low to avoid disturbing the others, for instance, when at midnight or someone is studying or working in the room. His pleasure of enjoying the music or movie is restricted and affected.

Alternatively, an earphone may be connected to the host computer for transmitting the music or sound signals from the host computer to a user's ears. Thereby, the user can listen to his favorite music transmitted to the earphone and would not disturb other people in the room or cause noise pollution.

Currently, most computers or notebook computers are equipped with wired earphone. When a user uses an earphone, he is restricted to move within a small area limited by the length of the cable. If he moves to a distance larger than the length of the cable, the cable of earphone may be pulled or the earphone may be plugged off. Moreover, the user has to be very careful to avoid winding of stuffs around the user by the cable. It causes inconveniences to the user, especially when the user is watching a television. He has to sit still in front of the computer and cannot follow the music rhythm and dance. Otherwise, he has to move to another place that allows him to broadcast the music by speakers. Also, when he is watching a movie and if he wants to take anything far away e.g. a drink from the kitchen or if he wants to go to the toilet, he has to put off his earphone.

Thus, the present invention is aimed to provide a wireless audio signal transmission to overcome the above problems.

SUMMARY OF THE INVENTION

The primary object of the present invention is to provide a computer system with a wireless audio signal transmitter module. Thereby, the audio signals can be transmitted by wireless manner to the earphone of a user. Hence, the user can be freed from the winding of cable and move to any place as long as it is within the effective transmission distance of the wireless audio signal transmitter module.

Another object of the present invention is to provide a computer system with a wireless audio signal transmitter module and a plurality of wireless signal receivers located at different positions. Within the effective transmission distance, the audio signals from the wireless audio signal transmitter module can be transmitted to the audio signal receivers which have identical frequency and coding. Thereby, the audio signals from a host computer are simultaneously transmitted to many users at different location.

To achieve the above objects, in accordance with the present invention, there is provided a computer system comprising a wireless audio signal transmitter module for receiving an audio signal from a sound effect interface. The audio signal is processed and modulated, and then transmitted out from an antenna to at least one wireless signal receiver located within an effective transmission distance. The wireless audio signal transmitter module comprises an audio signal processing circuit, a signal modulation circuit, an amplification circuit and a wireless signal transmitting circuit.

The wireless audio signal transmitter module also comprises a tuning device and an encoding unit. The tuning device is capable to provide a fixed frequency or adjustable frequency for the signal modulation circuit, while the encoding unit selectively encodes and/or enciphers the signal. The wireless signal receiver comprises a wireless signal receiver circuit, a filtering and amplification circuit, a signal demodulation circuit and a microphone. The wireless signal receiver also comprises a tuning device for tuning and a decoding unit for encoding and/or enciphering.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENTS

Figure 1:
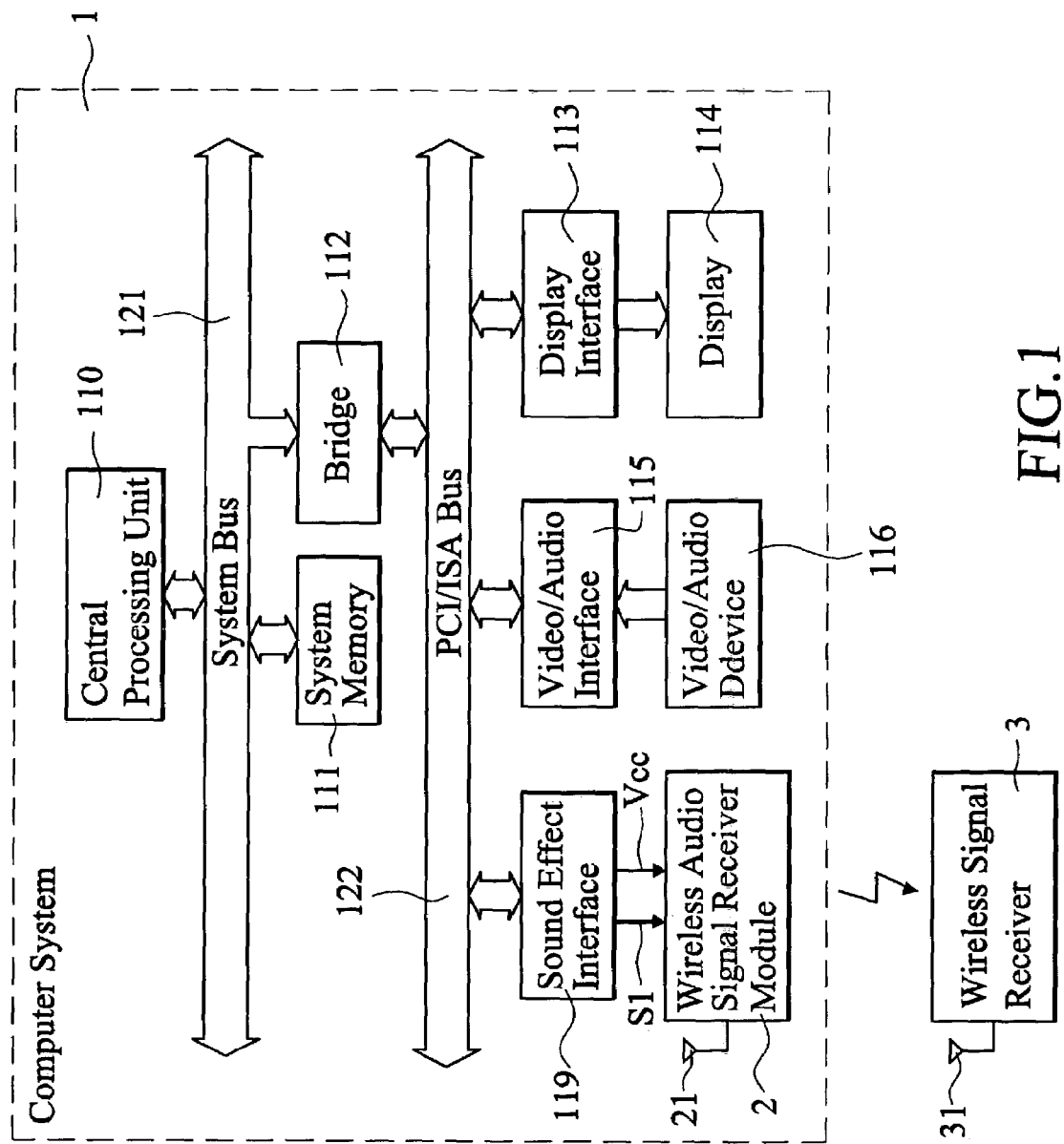
FIG. 1 is a system block diagram of a first embodiment of a computer system in accordance with the present invention.

With reference to the drawings and in particular to FIG. 1, a computer system 1 comprises a central processing unit 110, a system memory 111, a bridge 112, a display interface 113 and a display 114. The central processing unit 110 and the system memory 111 are coupled to each other by a system bus 121 of the computer system 1. The system bus 121 is connected to a PCI/ISA bus 122 by the bridge 112 whereby the display 114 receives and displays video signals of the computer system 1 from the PCI/ISA bus 122 via the display interface 113. The computer system 1 may selectively incorporate multimedia devices, such as a video/audio device 116 that is coupled to the PCI/ISA bus 122 by a video/audio interface 115.

A sound effect interface 117 is connected to the PCI/ISA bus 122 of the computer system 1. The sound effect interface 117 receives an audio signal data from the central processing unit 110 of the computer system 1 through the PCI/ISA bus 122, bridge 112, and the system bus 121. Then the sound effect interface 117 outputs an audio signal S1 through an audio signal output port thereof.

The computer system 1 comprises a wireless audio signal transmitter module 2 that is coupled to the output port of the sound effect interface 117 for receiving the audio signal S1 from the sound effect interface 117. The audio signal S1 is processed and modulated, and then transmitted out via an antenna 21.

The wireless signal transmitted by the wireless audio signal transmitter module 2 may be received by a remote wireless signal receiver 3 via an antenna 31. The received audio signal is demodulated and processed to generate a sound signal which is transmitted to an earphone of a user.

Figure 2:
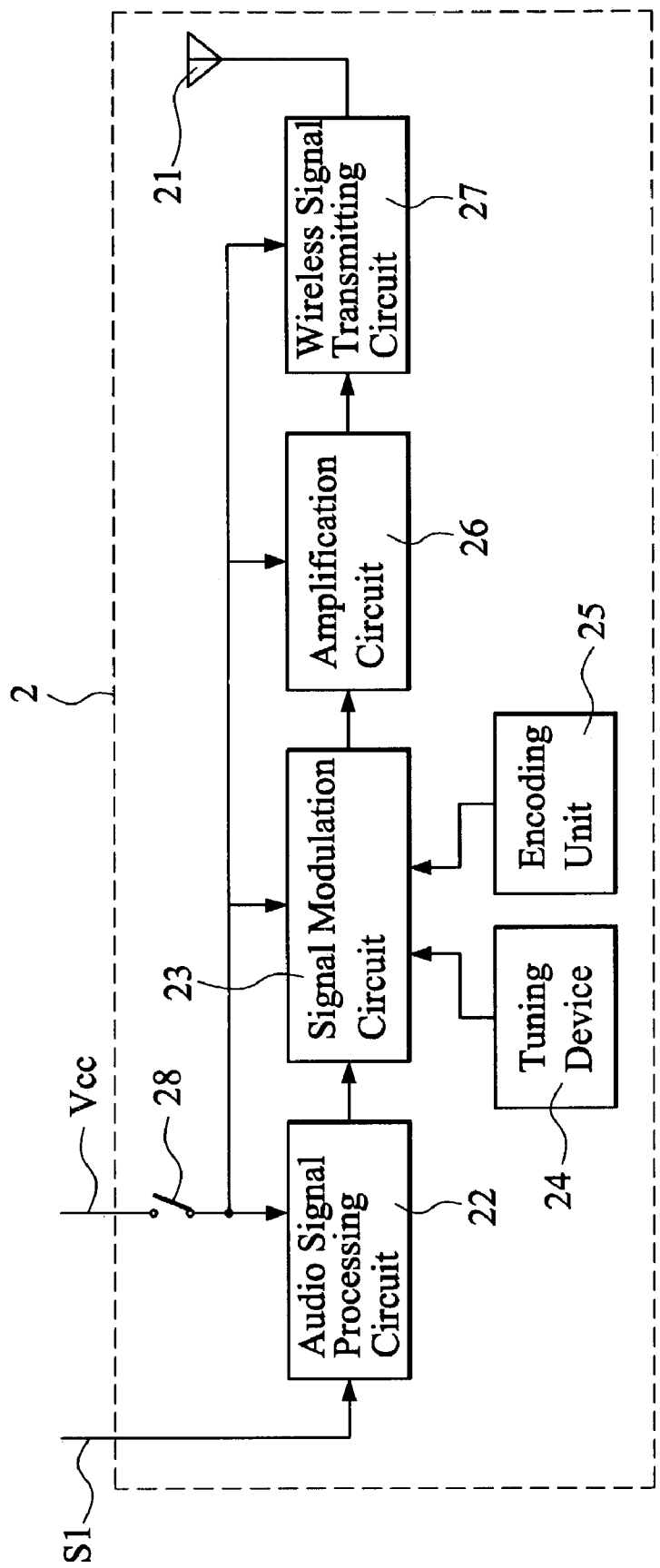
FIG. 2 is system block diagram of a wireless audio signal transmitter module of the computer system in accordance with the present invention.

Also referring to FIG. 2, a block diagram shows the wireless audio signal transmitter module of the computer system in accordance with the present invention. The wireless audio signal transmitter module 2 comprises an antenna 21, an audio signal processing circuit 22, a signal modulation circuit 23, a tuning device 24, an encoding unit 25, an amplification circuit 26 and a wireless signal transmitting circuit 27.

The antenna 21 is capable of transmitting wireless signals out within an effective transmission distance. The effective transmission distance of the antenna 21 may be set to e.g. 30 meters in a preferred embodiment of the present invention.

The audio signal processing circuit 22 receives and processes the audio signal S1 from the sound effect interface 117 of the computer system, and converts it into a wireless signal and then forwards it to the signal modulation circuit 23 for signal modulation.

The signal modulation circuit 23 is coupled with the tuning device 24 and the encoding unit 25 (or alternatively or additionally an enciphering unit). The tuning device 24 may be embodied as a selection knob or a switching button to allow for manual tuning. Apparently, the tuning device 24 may be devised to provide a fixed frequency or adjustable frequency for the signal modulation circuit 23. Thereby, the mutual interference among the audio signal transmitter modules of nearby computers can be avoided.

The encoding unit 25 selectively encodes and/or enciphers the signal. Once the encoding/enciphering is performed in the wireless audio signal transmitter module 2, a decoding/deciphering operation must be performed in the wireless signal receiver 3. The decoding/deciphering means secures the transmission of confidential audio signal.

The wireless signal modulated by the signal modulation circuit 23 is forwarded to and amplified by the amplification circuit 26. The amplified signal is then applied to the wireless signal transmitting circuit 27 and converted into a RF signal which is transmitted by the antenna 21 as the wireless signal.

A power source Vcc for the wireless audio signal transmitter module 2 may be comprised of a power supply of the computer system 1 and is selectively connected to the components or circuits 22, 23, 24, 25, 26 and 27 by a switch 28. Alternatively, the power source Vcc may be directly obtained from a power pin of the bus of the computer system 1.

Figure 3:
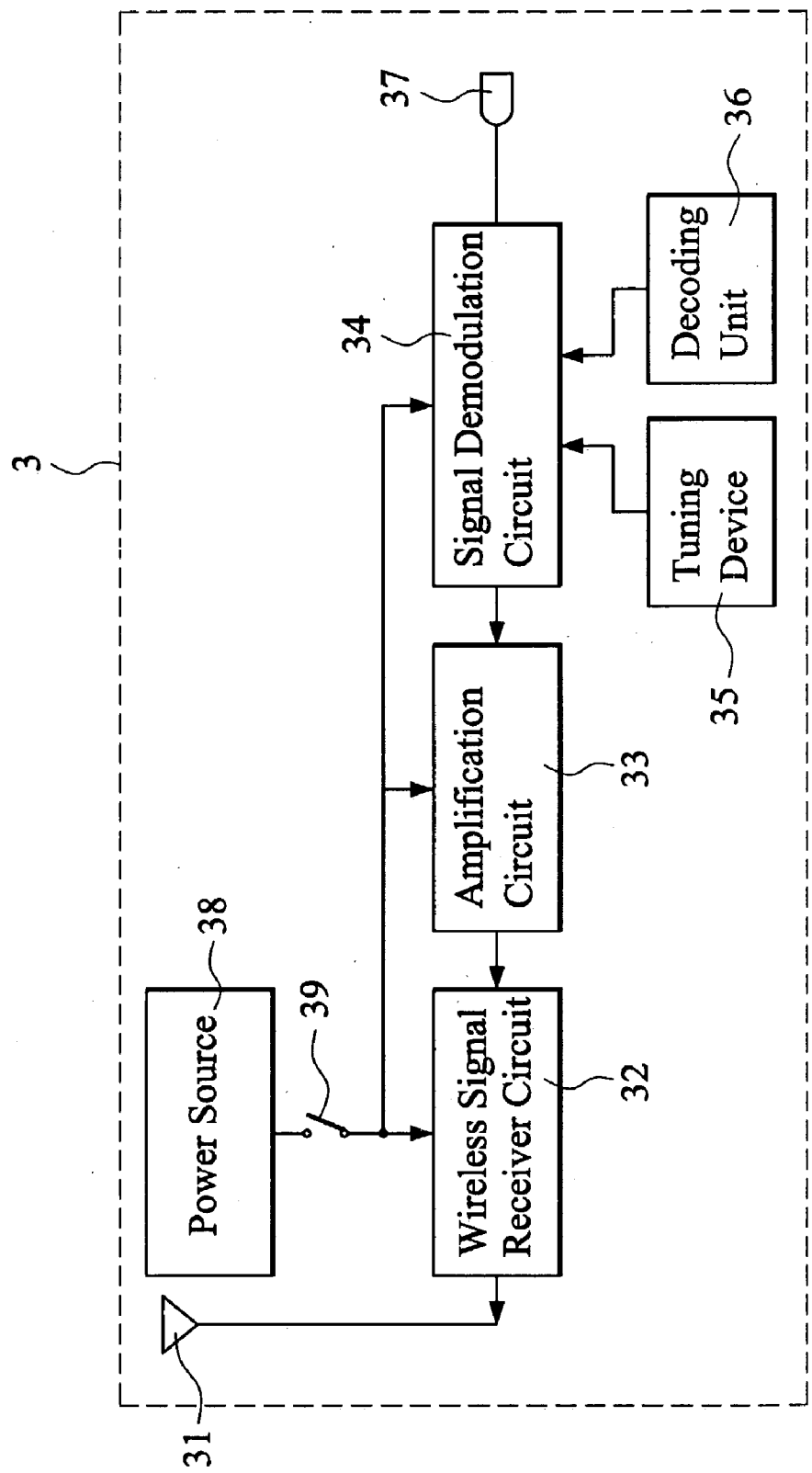
FIG. 3 is a block diagram of a wireless signal receiver of the computer system in accordance with the present invention.

FIG. 3 is a block diagram of a wireless signal receiver of the present invention. The wireless signal receiver 3 comprises an antenna 31, a wireless signal receiver circuit 32, a filtering and amplification circuit 33, a signal demodulation circuit 34, a tuning device 35, a decoding unit 36 and a microphone or earphone 37.

The antenna 31, which is coupled to the wireless signal receiver circuit 32, receives the wireless signal transmitted from the wireless audio signal transmitter module 2 and applies the received wireless signal to the wireless signal receiver circuit 32. The wireless signal is then forwarded through and processed by the filtering and amplification circuit 33 for filtering noises out and amplification of the signal. The signal demodulation circuit 34 then demodulates the amplified signal. The demodulated signal is transmitted to the microphone or earphone 37, from which a user can get a sound signal.

The signal demodulation circuit 34 is also coupled to a tuning device 35 and a decoding unit 36. The tuning device 35 may be embodied as a selection knob or a switching button to allow for manual tuning. Apparently, the tuning device 35 may be devised to provide a fixed frequency or adjustable frequency for the signal demodulation circuit 34. The tuning device 35 is set in correspondence with the tuning device 24 in the wireless audio signal transmitter module 2 to coordinate signal transmission between the audio signal transmitter module 2 and the wireless signal receiver 3.

The wireless audio signal transmitter 3 comprises a power source 38, such as a battery, which supplies power, via a switch 39, to the components of the receiver 3, such as the wireless signal receiver circuit 32, the filtering and amplification circuit 33, and the signal demodulation circuit 34. The switch 39 allows for manually shutting down the receiver 3.

With the above described circuit arrangement in accordance with the present invention, the audio signal generated by the video/audio interface 115, video/audio device 116 or other audio generating device is processed and modulated by the wireless audio signal transmitter module 2, and then transmitted as wireless signal from the antenna 21. The wireless signal is received by the antenna 31 of the remote wireless signal receiver 3 located within an effective transmission distance of the wireless audio signal transmitter module 2. After demodulation and processing, the audio signal is transmitted to the microphone and converted into sound signal. Thereby, the user can get the sound signal via the wireless earphone conveniently.

Figure 4:
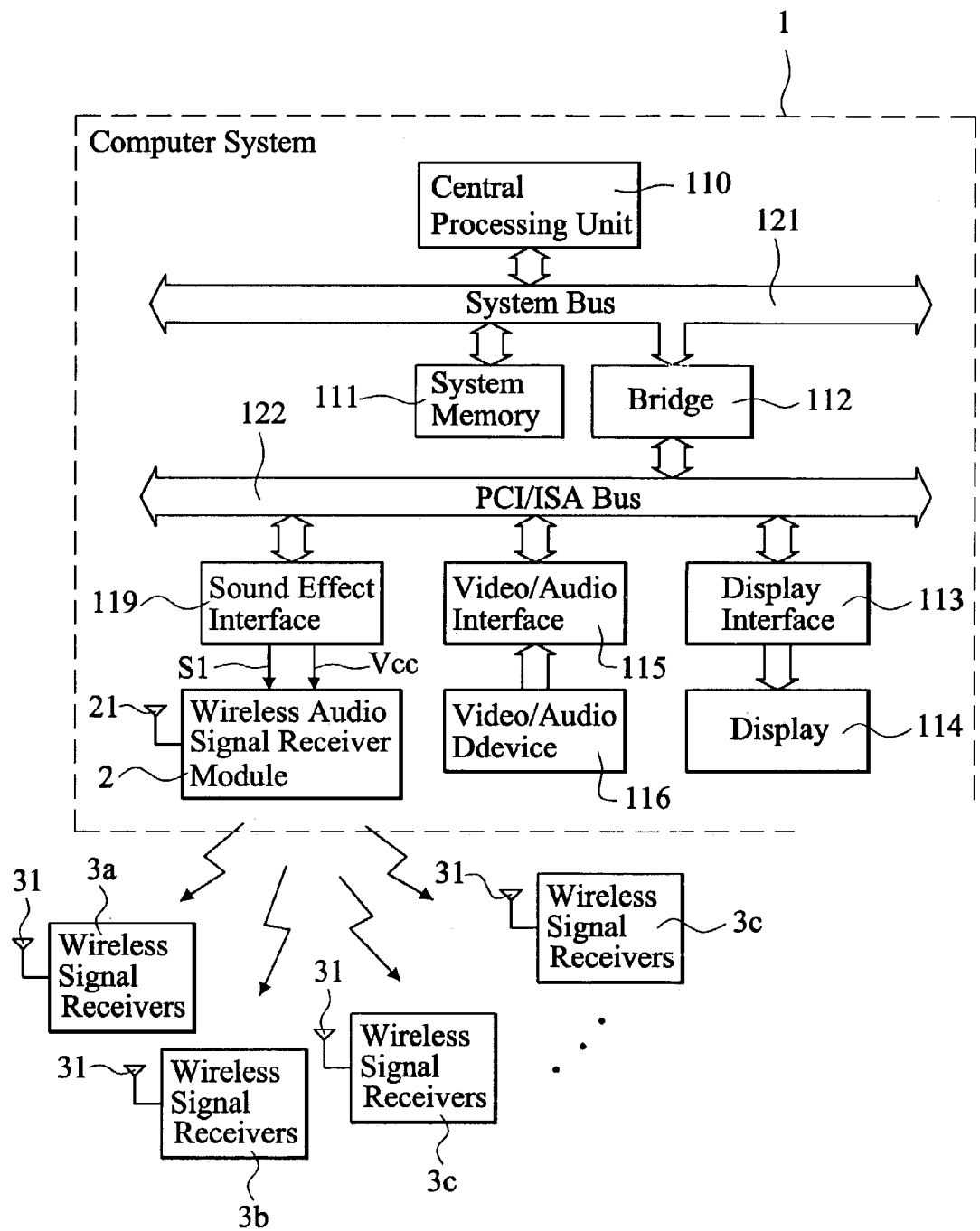
FIG. 4 is a block diagram of a second embodiment of a computer system in accordance with the present invention.

FIG. 4 is a block diagram of a second embodiment of a computer system in accordance with the present invention. Similar to the first embodiment as described above, a sound effect interface 117 is connected to the PCI/ISA bus 122 of computer 1. An audio signal S1 from an output port of the sound effect interface 117 is transmitted to a wireless audio signal transmitter module 2.

Most components in FIG. 4 are identical with those shown in FIG. 1, except that a plurality of wireless signal receivers 3a, 3b, 3c . . . 3n are equipped to the computer system. The other components and devices of this embodiment are similar to that of the first embodiment described above. Wherever possible, the same reference numbers will be used throughout the drawings to refer to the same or like parts.

Each of the wireless signal receivers 3a, 3b, 3c . . . 3n comprises similar components and circuitry as the wireless signal receiver 3 as shown in FIG. 3. Moreover, the tuning device of each of the wireless signal receivers 3a, 3b, 3c . . . 3n is set at a fixed frequency or adjustable frequency in correspondence with the tuning device 24 of the wireless audio signal transmitter module 2. The decoding unit of each of the wireless signal receivers 3a, 3b, 3c . . . 3n performs a decoding and/or deciphering operation corresponding to the encoding/enciphering operation performed in the encoding unit 25 of the wireless audio signal transmitter module 2.

With the arrangement, each wireless signal receiver 3a, 3b, 3c . . . 3n located within an effective transmission distance can receive the wireless signal transmitted from the wireless audio signal transmitter module 2. For other wireless signal receivers which have different tuning frequencies or whose encoding/enciphering operations are performed in correspondence to different encoding/enciphering operations, they are not able to receive the wireless signal transmitted from the wireless audio signal transmitter module 2.

Accordingly, the wireless signal transmitted from the wireless audio signal transmitter module can be transmitted simultaneously to a plurality of remote wireless signal receivers which possess identical tuning frequency and coding method. Thereby, a group of users can simultaneously receive sound signals from the host computer.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A computer system with a wireless signal transmitter module for transmitting a wireless signal, which comprises:
    a sound effect interface connected to the computer system for output of an audio signal; and
    a wireless audio signal transmitter module coupled to the sound effect interface, the wireless audio signal transmitter module receives the audio signal through the sound effect interface, the wireless audio signal transmitter module including (a) an audio signal processing circuit for receiving the audio signal from the sound effect interface and generating a wireless signal, (b) a signal modulation circuit coupled to the audio signal processing circuit for modulating the wireless signal received therefrom, (c) an enciphering unit coupled to the signal modulation circuit for enciphering the wireless signal prior to modulation thereof, (d) an amplification circuit coupled to the signal modulation circuit for amplification the encrypted and modulated wireless signal, and (e) a signal transmitting circuit having an input coupled to the amplification circuit and an output coupled to a first antenna for transmitting the encrypted and modulated wireless signal to at least one remote wireless signal receiver located within an effective transmission distance from the wireless audio signal transmitter module.

2. The computer system as claimed in claim 1, wherein the wireless audio signal transmitter module further comprises a tuning device coupled to the signal modulation circuit.

3. The computer system as claimed in claim 1, wherein the wireless audio signal transmitter module further comprises an encoding unit coupled to the signal modulation circuit.

4. The computer system as claimed in claim 1, wherein the wireless signal receiver comprises:
    a wireless signal receiver circuit connected to a second antenna for receiving the encrypted and modulated wireless signal transmitted by the wireless audio signal transmitter module;
    a filtering and amplification circuit coupled to the wireless signal receiver circuit for filtering and amplifying the received signal of the wireless signal receiver circuit;
    a signal demodulation circuit coupled to the filtering and amplification circuit for demodulating the amplified signal of the filtering and amplification circuit and providing a demodulated signal;
    a deciphering unit coupled to the signal demodulation circuit for deciphering the demodulated signal to recover the audio signal; and
    a transducer coupled to the signal demodulation circuit for reproducing an aural signal corresponding to the audio signal.

5. The computer system as claimed in claim 4, wherein the wireless signal receiver further comprises a tuning device coupled to the signal demodulation circuit.

6. The computer system as claimed in claim 4, wherein the wireless signal receiver further comprises a decoding unit.

7. The computer system as claimed in claim 4, wherein the wireless signal receiver comprises a power source comprised of a battery.

8. A computer system with a wireless signal transmitter module for transmitting a wireless signal, which comprises:
    a computer including a sound effect interface for generating an audio signal and output of the audio signal;
    a wireless audio signal transmitter module coupled to the sound effect interface for receiving the audio signal from the sound effect interface, the wireless audio signal transmitter module including (a) an audio signal processing circuit for receiving the audio signal from the sound effect interface and generating a wireless signal, (b) a signal modulation circuit coupled to the audio signal processing circuit for modulating the wireless signal, (c) an enciphering unit coupled to the signal modulation circuit for enciphering the wireless signal prior to modulation thereof, (d) an encoding unit for encoding the wireless signal output from the audio signal processing circuit, (e) an amplification circuit coupled to the signal modulation circuit for amplifying the modulated, encoded and enciphered wireless signal, and (f) a first tuning device coupled to the signal modulation circuit for setting a transmission frequency of the wireless audio signal transmitter module, (g) a signal transmitting circuit having an input coupled to the amplification circuit and an output coupled to a first antenna for transmitting the amplified wireless signal from the amplification circuit; and
    a plurality of wireless signal receivers, each of the wireless signal receivers including a second tuning device set at a frequency in correspondence with the transmission frequency of the wireless audio signal transmitter module, a decoding unit for performing a decoding operation corresponding to the encoding unit of the wireless audio signal transmitter module, and a deciphering unit corresponding to the enciphering unit of the wireless audio signal transmitter module;
    wherein each of the wireless signal receivers are located within an effective transmission distance of the wireless audio signal transmitter module receives the wireless signal transmitted from the wireless audio signal transmitter module.

9. The computer system as chimed in claim 8, wherein each of the wireless signal receivers further comprise:
    a wireless signal receiver circuit connected to a second antenna for receiving the encoded, encrypted and modulated wireless signal transmitted by the wireless audio signal transmitter module;
    a filtering and amplification circuit coupled to the wireless signal receiver circuit for filtering and amplifying the received signal of the wireless signal receiver circuit;
    a signal demodulation circuit coupled to the filtering and amplification circuit for demodulating the amplified signal of the filtering and amplification circuit and providing a demodulated signal, the second tuning device, the decoding unit and the deciphering unit being coupled to the signal demodulation circuit; and
    a transducer coupled to the signal demodulation circuit for reproducing an aural signal corresponding to the audio signal.

10. The computer system as claimed in claim 8, wherein each of the wireless signal receivers comprises a power source comprised of a battery.

* * * * *